UNITED STATES PATENT OFFICE.

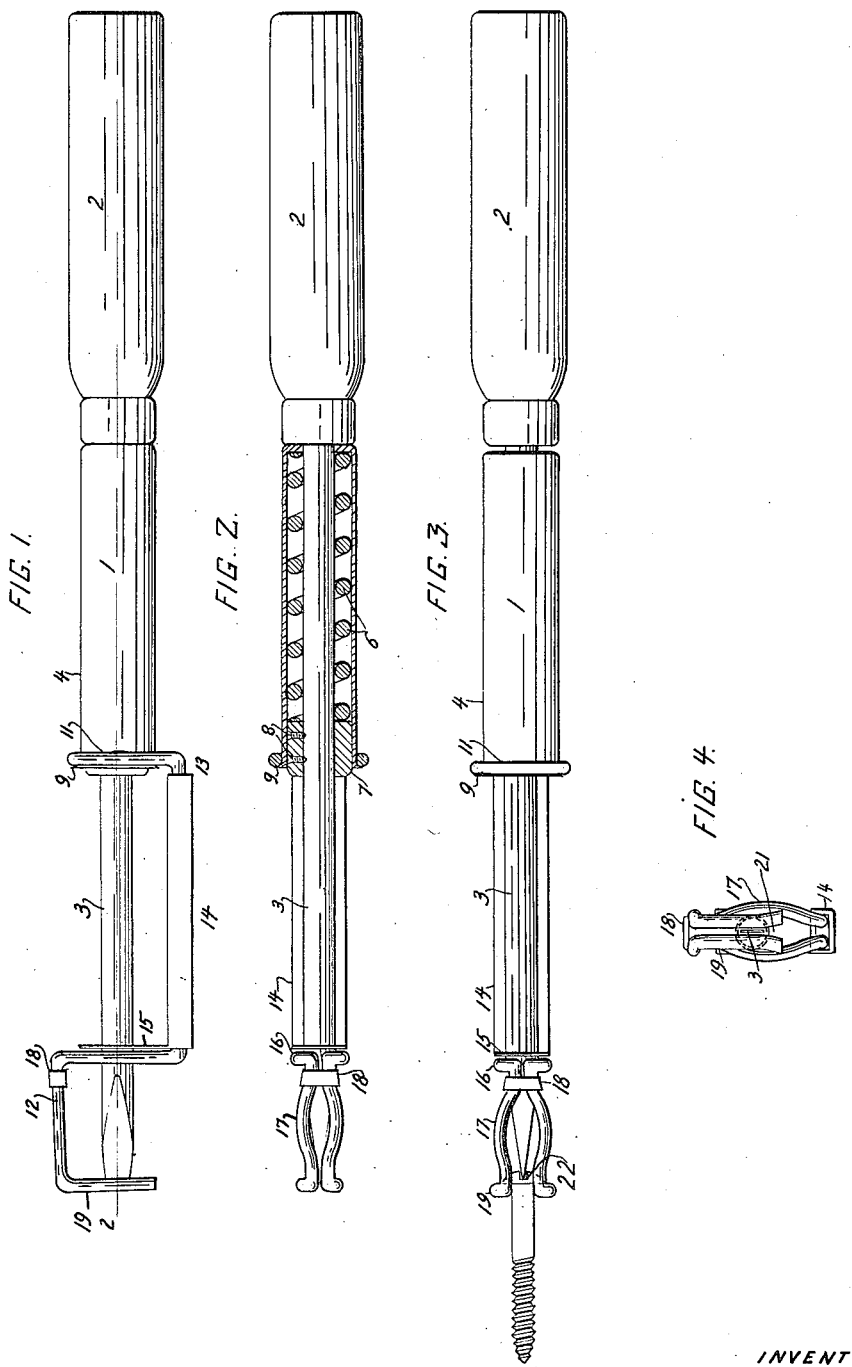

WILLIAM JAMES CARLIN, OF VALLEJO, CALIFORNIA.

SCREWDRIVER ATTACHMENT.

1,374,057. Specification of Letters Patent. Patented Apr. 5, 1921.

Application filed June 5, 1919. Serial No. 301,863.

*To all whom it may concern:*

Be it known that I, WILLIAM JAMES CARLIN, a citizen of the United States, residing at Vallejo, in the county of Solano and State of California, have invented new and useful Improvements in Screwdriver Attachments, of which the following is a specification.

The object of the present invention is to provide an attachment to a screw driver which will facilitate the driving of screws into objects in places which cannot be reached by the hand of the operator, as into a ceiling above his reach.

In the accompanying drawing, Figure 1 is a side view of a screw driver with my improved attachment attached thereto; Fig. 2 is a cross sectional view on the line 2—2 of Fig. 1, certain parts being shown in side elevation; Fig. 3 is a view taken at right angles to Fig. 1, showing a screw held in position by the screw driver; Fig. 4 is an end view of the attachment and screw driver.

Referring to the drawing, 1 indicates a screw driver having a handle 2, and a shank 3. Slidable upon the shank 3 is a spring casing 4, in which is a spring 6 coiled around said shank and abutting at one end against the inner end of the said casing and at the other end against a guideway 7 within the open end of the spring casing secured to said shank either by being shrunk thereon or by set screws 8.

The open end of said casing has an outwardly extending flange 9 to retain around said casing a loop 11 formed of the middle portion of a stout spring wire 12. The two sides of said wire, after making said loop, extend, as shown at 13, closely adjacent to each other approximately parallel with the shank of the screw driver, and are held together by a band 14 of sheet metal, from which, at the end remote from the spring casing, extends inwardly toward said shank at right angles, a guide 15 apertured to permit said shank to move therethrough. Said wire portions are also bent inwardly after leaving the band 14 and extend closely adjacent to said guideway 15, and diverge slightly, as shown at 16, to surround said shank 3 and then converge and again extend, as shown at 17, in a plane parallel with said shank, but on the other side thereof from the portions 13. They are bound together by a short band 18, and, in said plane, first slightly diverge and then again converge to a point substantially opposite to the end of the screw driver. They then extend, as shown at 19, transversely to said shank and to the other side thereof, and diverge at their outer ends to form a holder 21.

In use, the wire holder is pushed outward, drawing with it the spring casing 4, against the pressure of said coiled spring, to a sufficient distance to permit the shank of a screw or bolt to be inserted between the diverging ends of the wire and to such a position that, when said wire holder 21 is drawn back by the pressure of said coiled spring 6, the end of the screw driver may be inserted in the slot 22 of the screw or bolt-head. In this position, the screw is very firmly held by the holder, the coiled spring pressing the head of the screw firmly against the ends 21 of the holder. The screw can then be driven into any surface which can be reached by the end of the screw driver held in the outstretched hand.

The screw is held firmly when the screw driver is turned and pressure can be applied thereto equally as well as, if not better than, if the screw were held in the other hand.

I claim:—

In combination with a screw driver, a spring casing slidable upon the shank of said screw driver, a spring therein coiled around said shank and abutting at one end against the inner end of said casing, a guideway secured to the shank for the spring casing, against which the other end of the spring abuts, a wire doubled to form a loop surrounding and retained by said casing, sides of said wire extending from said loop closely adjacent to each other approximately parallel with the shank of the screw driver, then extending transversely to said shank to the other side thereof, then extending approximately parallel with said shank, and then, at a point substantially opposite to the end of the screw driver, extending transversely to said shank and to the other side thereof and diverging at their ends and bands surrounding the portions of the wire which extend parallel to the shank.

WILLIAM JAMES CARLIN.